United States Patent [19]

Bevilacqua

[11] 4,070,239

[45] Jan. 24, 1978

[54] BALL CHECK VALVE

[75] Inventor: Frank Bevilacqua, Windsor, Conn.

[73] Assignee: Combustion Engineering, Inc., Windsor, Conn.

[21] Appl. No.: 679,582

[22] Filed: Apr. 23, 1976

[51] Int. Cl.² .................. G21C 17/08; F16K 15/08
[52] U.S. Cl. ................................ 176/19 R; 251/82; 137/533.11
[58] Field of Search ............ 176/19, 35, 36; 251/65, 251/82; 137/322, 533.11

[56] References Cited

U.S. PATENT DOCUMENTS

| | | | |
|---|---|---|---|
| 2,569,316 | 9/1951 | Jerman | 251/65 |
| 3,769,156 | 10/1973 | Brecy | 176/19 R |
| 3,840,432 | 10/1974 | Malaval | 176/36 R |
| 3,844,884 | 10/1974 | Frank et al. | 176/36 R |
| 3,893,651 | 7/1975 | Uecker | 176/19 R |

Primary Examiner—Samuel W. Engle
Assistant Examiner—S. A. Cangialosi
Attorney, Agent, or Firm—Arthur L. Wade

[57] ABSTRACT

A pressurized nuclear reactor having an instrument assembly sheathed in a metallic tube which is extended vertically upward into the reactor core by traversing a metallic guide tube which is welded to the wall of the vessel. Sensors in each instrument assembly are connected to instruments outside the vessel to manifest the conditions within the core. Each instrument assembly probe is moved into position within a metallic guide channel. The guide channel penetrates the wall of the vessel and forms part of the barrier to the environment within the pressure vessel. Each channel includes a ball check valve which is opened by the instrument assembly probe when the probe passes through the valve. A ball valve element is moved from its seat by the probe to a position lateral of the bore of the channel and is guided to its seat along a sloped path within the valve body when the probe is removed.

5 Claims, 3 Drawing Figures

BALL CHECK VALVE

BACKGROUND OF THE INVENTION

1. Field of the Invention

The present invention relates to automatic ball check valves operated by gravity and seated by the differential pressure across the ball. More specifically, the invention relates to a ball pushed from its seat along a sloped track by a probe, which probe will be removed by a change in conditions demanding the re-seating of the ball on its seat.

2. Description of the Prior Art

It is often desirable or even necessary to insert probes, such as instrument probes, into an enclosure to detect variables of the environment within the enclosure. The mechanical structure for inserting these probes into the enclosure may include wet or dry tubes, wells or thimbles. One example of these structures is simply a tube which is sealed to the shell of the enclosure for penetration of its interior. An instrument probe incapulated in a dry tube or thimble is guided through this tube to the interior of the enclosure.

The pressure vessel of a nuclear reactor is an example of the enclosures into which dry wells can be installed for receiving instrument probes which remain isolated from the environment in the vessel or in which guide paths can be formed through the vessel which allows instrument probes to be guided into the reactor but which exposes them to the environment within the vessel. A common measurement made by these probes is neutron flux in the core. Since the upper part of the reactor vessel is designed to receive the fuel charging installations, the guide paths are usually provided through the bottom of the vessel and extended into the internal structures which support the fuel assemblies.

The internal pressure of nuclear reactors can be very high. If any of the tubes of the guide paths were to fail, the pressurized contents of the reactor vessel would escape through the failed tubes.

In the past, manually operated valves on the guide tube have been provided. An automatic ball check valve for a dry tube, or thimble, was provided by the system disclosed in U.S. Pat. No. 3,893,651 issued July 8, 1975 to Donald F. Uecker. However, the effectiveness of this system is limited to wells extended vertically downward into a monitored environment. It is true that the patent generally discloses the orientation of the well and valve for extension vertically upward into the environment. However, a more positive, guided travel of the ball valve element is required to insure consistent operation of the valve upon downward withdrawal of the probe.

U.S. Pat. No. 3,769,156 issued Oct. 30, 1973 to Jean Brecy discloses a system for inserting flux-measuring probes upward into the pressure vessel of a nuclear reactor. The sensors are each movable inside a guide tube which slides in a channel. The channel is connected at one end to the vessel bottom, the other end leading to a measuring room. Each channel is provided an adjustable seal between the inner surface of the channel and the outer surface of the channel and the outer surface of its guide tube. No purpose will be served by further analysis of this system as it is evident from a cursory inspection of the disclosure that the seal provided against release of vessel contents is not automatically actuated but is manually adjustable between its two positions. The problem remains of providing upward insertion of instrument probes in the reactor vessels, together with ball valve sealing which is automatic upon failure of the tube externally sealed to the vessel wall.

SUMMARY OF THE INVENTION

It is an object of the present invention to push a ball valve element from its seat, against the force of gravity, and guide the ball along a path sloped from the vertical to provide lateral displacement of the ball from the vertical to a position where the ball will be isolated from the foreign matter, crud, or debris which could prevent the ball from moving to its seat.

It is another object to provide the sloped path with a single insert member fixed in position within the body of the valve.

It is another object to adjust pressure differences across the ball valve to obviate opposition to the force of gravity moving the ball along the sloped path to engagement with its seat.

The present invention contemplates a valve body connected to the open end of a tube, or passage, extended vertically upward into a pressurized environment to be monitored. The valve body has a seat vertically aligned with the tube through which seat a probe to sense a variable of the environment is extended up into the pressurized environment. The valve body contains a recess and an insert member which forms a path sloped from the vertical for the ball valve element along which the ball is guided as the ball is pushed from below by the probe. A passageway may also be provided from the upper end of the sloped path to the pressurized environment to permit pressure equalization across the ball valve when the probe is removed.

Other objects, advantages and features of this invention will become apparent to one skilled in the art upon consideration of the written specifications, appended claims, and attached drawings, wherein;

DESCRIPTION OF THE PREFERRED EMBODIMENT

Pressure Vessel of the Nuclear Reactor

Figure 1:
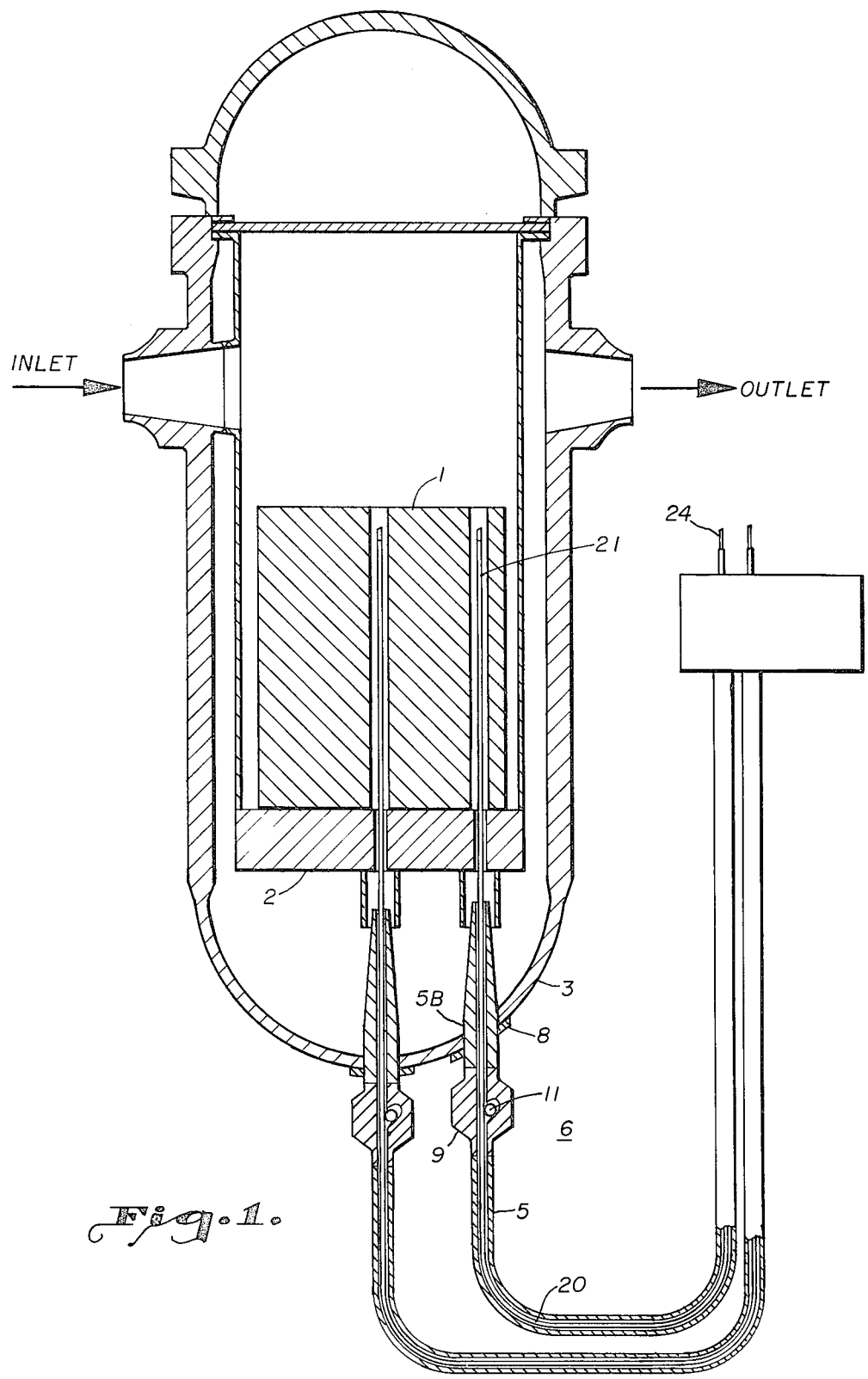
FIG. 1 is a diagrammatic transverse section through a nuclear reactor vessel provided with instrumentation embodying the invention.

Enough nuclear reactor structure is shown in FIG. 1 to provide an understanding of the invention. The core 1 is supported by structure 2 within the vessel 3. The vessel and core are supported within whatever concrete shielding enclosure is adequate. Numerous guide tubes are extended through the lower wall of the vessel 3, up into the core 1. Only one guide tube 5 is shown to embody the invention.

Tube 5 may be given various terms. It may be called an instrument nozzle, receiving a dry tube which, in turn, incapsulates an instrument probe. Again this tube 5 may be termed a channel. In all events, regardless of terminology, the tube functions as a pressure boundary for the internal pressure of vessel 3. It is closed by the valve structure of the invention at 6 when channel, tube, nozzle 5 fails and the instrument probe is withdrawn or ejected from this structure.

Again it is emphasized that reactor vessel 3 is only representative of other vessels whose interiors are to be monitored. Vessel 3 does represent those containers entered from below, through channels, tubes or nozzles. With these conditions understood as the only limitations of the embodiment, the invention in the structure for sealing the channels, tubes or nozzles of the vessels with an efficient ball valve.

The Valve in General

Figure 3:
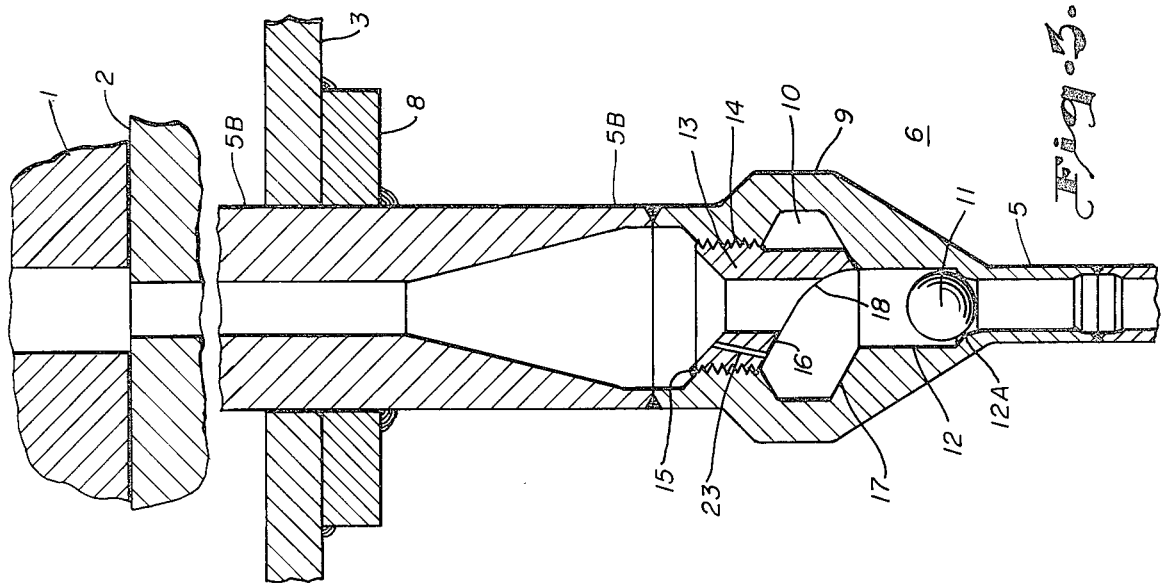
FIG. 3 is a view similar to FIG. 2, showing the valve in its closed position, the probe removed.
Figure 2:
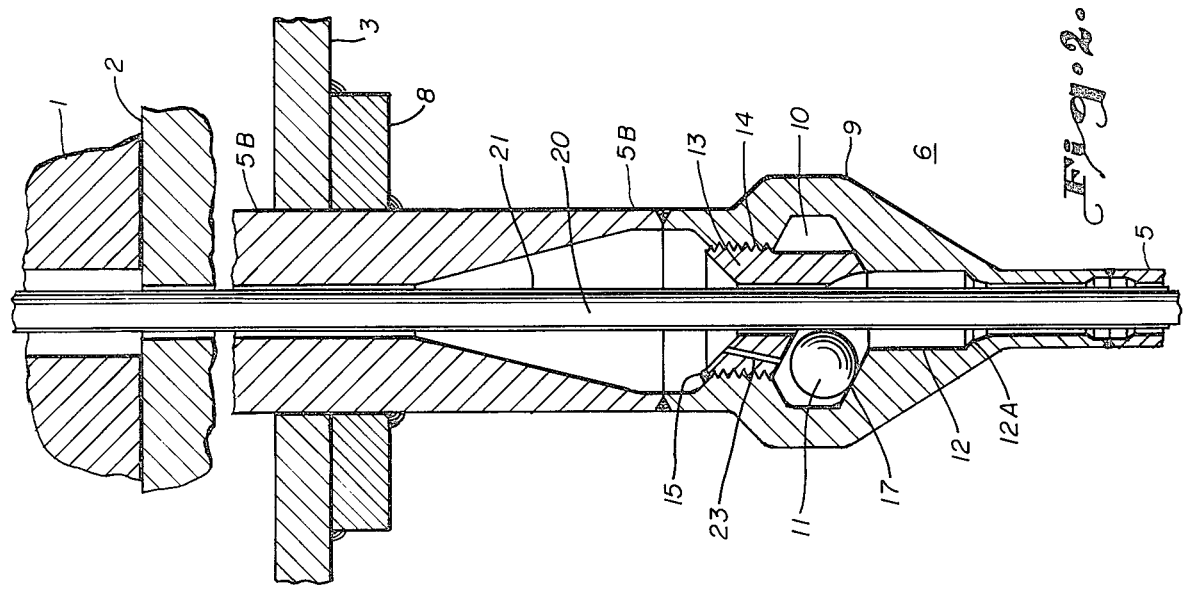
FIG. 2 is an elevated cross section of the valve in the instrumentation opened by the probe in place.

FIGS. 2 and 3 are of the same valve. FIG. 3 discloses the valve with its ball on the valve seat. FIG. 2 discloses the valve with its ball moved from its set to a position lateral of the passage by a probe passing through the seat.

In FIG. 2, the lower wall of the pressure vessel 3 has an opening, made up of a bottom nozzle 5B, to which is attached valve 6 to which is attached guide tube 5. Weld build-up 8 may, or may not, be necessary as a part of bottom nozzle 5B to penetrate the wall of vessel 3. The instrument probe is to be extended up through the axial passage of tube 5, through the valve attached to the upper end of tube 5, through the nozzle 5B and into the reactor core 1.

Valve body 9 is usually welded to the end of tube 5 and nozzle 5B. Within the body is provided an internal cavity 10 in which a seat is formed for engaging the valve element to seal the internal pressure of the container 3.

The cavity 10 is symmetrical about the axis of valve body 9 and the axial passage of tube 5. It is large enough to enable the valve element 11 to be lateral of the axis of the body 9 and tube 5 to a position where it will be isolated from foreign matter, crud or debris which may fall from the bore of tube 5 into the valve body.

More specifically, ball valve element 11 descends through passage 12 of the lower part of cavity 10 to engage seat 12A. The passage 12 is sized to give positive guidance to ball 11 so the valve element will be quickly centered upon seat 12A when released at the upper end of passage 12.

Insert 13

Insert 13 provides guidance for the instrument probe inserted up from tube 5 and into nozzle 5B and a track for the lateral movement of ball 11 in cavity 10. The insert is basically a cylinder oriented co-axially with the valve body cavity. It is threaded at 14 into its axial position and secured by a tack weld at 15.

The track is provided by a cut 16 parallel to lower cavity wall 17 and a cut 18 which extends cut 16 to register with the side of passage 12. The result of this structural arrangement is a track sized to accommodate ball valve 11 as it is moved up from seat 12A, out of the upper end of passage 12 and up along the slope of side 17. In general, the ball 11 has two positions. It is either engaged with seat 12A or at the upper end of the sloped track in cavity 10. The ball 11 moves downward, along this track to the upper end of passage 12. The ball then drops down passage 12 to its seat 12A for the required seal. The track, and the movements of ball 11 along it, are all defined by the insert 14. FIG. 3 shows the valve sealing, the instrument probe 20 having been either ejected or withdrawn. FIG. 2 shows the valve opened, the instrument probe 20 inserted through the valve and into the core 1.

The Probe in Position

FIG. 2 discloses the valve actuated to its open position, the probe 20 having been inserted up through seat 12 A to move element 11 to the upper end of its track. The element is moved laterally of the aligned bores of tube 5 and valve body 9. It is apparent the ball is out of the path of foreign matter, crud and debris which may fall down the aligned bores. The ball is held in this position only by the probe. Once probe 20 is removed, the ball 11 is free to fall to seat 12A.

Probe 20 is disclosed as comprised of an instrument assembly tube 21 which is closed at its upper end. It is this complete assembly which is thrust upward, into the position disclosed in FIG. 2.

Pressure Equalization

There may be some possibility that ball valve element 11 will hang-up in the FIG. 2 position after probe 20 is removed. The pressure of vessel 3 may act upon the side of the ball 11 to resist its movement to seat 12A.

There is little danger of this hang-up force developing effectively. However, the force is positively prevented from developing by extending a hole 23 from the pressure zone above insert 13 to the upper end of the track below insert 13. The hole 23 is disclosed as extended through insert 13 itself. Of course the hole could be extended through the body 9 as well. Whatever path is used for hole 23, it transmits the pressure above the insert to behind the ball 11 to equalize the pressures across the ball. The ball is then moved by gravity in its fall to its seat.

CONCLUSION

The disclosure does not include an elaborate showing of the instrumentation which responds to the variable detected. There are leads 24 extending from the sensor, through the instrument assembly probe 20 to instrumentation which manifests the variable detected. The essential elements of the invention are embodied in the ball check valve 11 with its housing 9 attached to the lower end of nozzle, or tube 5B which penetrates the reactor vessel 3, thus allowing the instrument probe to be inserted into the core, more than one of these instrument probes are used during normal operation of the nuclear reactor.

During the handling of the fuel elements, it is essential to withdraw the instrument assembly probe from the core. For this reason the probes are designed to be slidable so that the tube length situated inside the vessel can be pulled out of the fuel assembly. The instrument assembly probe may require seals between its external wall and the internal wall of the guide tube 5 to prevent leakage. These seals are not of concern to this specific disclosure. It is the positive seal provided by valve 6 that is of immediate concern. When the instrument assembly probe is pulled from its channel, this valve must close, quickly and positively. The disclosed arrangement operates as desired.

From the foregoing, it will be seen that this invention is one well adapted to attain all of the ends and objects hereinabove set forth, together with other advantages which are obvious and inherent to the apparatus.

It will be understood that certain features and subcombinations are of utility and may be employed without reference to other features and subcombinations. This is contemplated by and is within the scope of the invention.

As many possible embodiments may be made of the invention without departing from the scope thereof, it is to be understood that all matter herein set forth or shown in the accompanying drawings is to be interpreted in an illustrative and not in a limiting sense.

The invention, having been described, what is claimed is:

1. A ball check valve adapted to be opened from below and to check fluid flow from above, including, a valve body having an axial passage extended vertically through the body, a cavity formed within the valve body and axially aligned with the vertical passage, a ball valve element within the cavity, a seat formed on the upper end of the portion of the vertical passage extended through the lower part of the valve body and into the cavity, an insert member positioned within the cavity from above the ball valve element and having an axial bore aligned with the body passage and having a cut arranged to form with a lower surface of the cavity a track which is sized to receive the ball valve element as the ball valve element is positioned from its engagement with seat to a location laterally removed from the axial passage of the body, and an elongated member sized for upward insertion through the axial passage and valve seat to position the ball valve element from the seat and along the sloped track to the position lateral of the axial passage.

2. The valve of claim 1, wherein, the insert member is formed of a cylindrical member threadedly engaged with the internal walls of the cavity to secure it in position and cut on its lower portion to provide a surface parallel the lower surface of the cavity to form the track for the ball valve element.

3. The valve of claim 2, including, a passageway formed in the insert member and extended from the upper end of the track to above the insert member as a vent between the cavity portion above the insert and the upper end of the track to maintain equal fluid pressures across the ball valve element when the ball is positioned to the upper end of the track so there will be no fluid pressure differential generated in opposition to gravitation of the ball down to its position on the seat when the elongated member is removed from the axial passage.

4. The valve of claim 3, wherein, the elongated member is an instrument probe adapted to be thrust upward through the axial passage and into an upper environment to be monitored and isolated from ambient conditions when the probe is removed downwardly from the axial passage.

5. An installation for measuring and controlling a nuclear reactor of which the core is situated in a pressurized reactor vessel, the installation having flux measuring instrumentation operatively connected to flux detectors contained within a tube or probe which is capable of penetrating into the core by sliding in a channel beneath said core, the channel having an axial bore and extending up through a lower wall of the reactor vessel, a valve body mounted on the channel, the valve body having an axial passage extended vertically through the valve body and aligned with the axial bore of the channel, a cavity formed within the valve body and axially aligned with the vertical passage, a ball valve element within the cavity, a seat formed on the upper end portion of the vertical passage extended through the lower part of the valve body and into the cavity, an insert member positioned within the cavity from above the ball valve element and having an axial bore aligned with the body passage and having a cut arranged to form with a lower surface of the cavity a track which is sized to receive the ball valve element as the ball valve element is positioned from its engagement with seat to a location laterally removed from the axial passage of the body, the probe sized for upward insertion through the axial passage and valve seat to position the ball valve element from the seat and along the sloped track to a position lateral of the axial passage, whereby the probe moves the ball valve element from the seat and lateral of the axial passage when inserted into the axial bore of the channel and the ball valve element falls onto the seat in a sealing relationship when the probe is removed to below the valve body.

* * * * *